United States Patent [19]

Kurby et al.

[11] Patent Number: 5,889,492

[45] Date of Patent: Mar. 30, 1999

[54] METHOD AND APPARATUS FOR AN ACQUISITION-AIDED GEO-LOCATING SUBSCRIBER UNIT

[75] Inventors: Christopher Neil Kurby, Elmhurst, Ill.; Thomas Michael King, Tempe, Ariz.

[73] Assignee: Motorola, Inc., Schaumburg, Ill.

[21] Appl. No.: 690,137

[22] Filed: Jul. 31, 1996

[51] Int. Cl.[6] .................................................. G01S 5/02
[52] U.S. Cl. .......................................... 342/357; 455/456
[58] Field of Search .................................. 342/357, 457; 364/449.7; 455/12.1, 456

[56] References Cited

U.S. PATENT DOCUMENTS

| | | | |
|---|---|---|---|
| 4,445,118 | 4/1984 | Taylor et al. | 342/357 |
| 5,119,504 | 6/1992 | Durboraw, III | 455/54.1 |
| 5,175,557 | 12/1992 | King et al. | 342/357 |
| 5,365,450 | 11/1994 | Schuchman et al. | 364/449 |
| 5,365,451 | 11/1994 | Wang et al. | 364/449 |
| 5,396,540 | 3/1995 | Gooch | 379/59 |
| 5,414,432 | 5/1995 | Penny, Jr. et al. | 342/357 |
| 5,467,282 | 11/1995 | Dennis | 364/449 |
| 5,511,233 | 4/1996 | Otten | 455/56.1 |
| 5,579,013 | 11/1996 | Hershey et al. | 342/357 |
| 5,664,006 | 9/1997 | Monte et al. | 455/405 |
| 5,727,057 | 3/1998 | Emery et al. | 379/211 |
| 5,732,387 | 3/1998 | Armbruster et al. | 79/206 |

*Primary Examiner*—Gregory C. Issing
*Attorney, Agent, or Firm*—Sherry J. Whitney; Jennifer B. Wuamett

[57] ABSTRACT

In a telecommunication system (15) with at least one gateway (1), at least one subscriber unit (2), a system controller (3), at least one communication satellite (4) and global positioning satellites (5), communication satellite (4) provides positioning information to subscriber units (2). System controller (3) uses links (13,14) with communication satellites (4) to control links (10,11) and links (8,9). Subscriber unit (2) receives on link (6) positioning information which is used by subscriber unit (2) to determine which global positioning satellites (5) are overhead. Knowing which global positioning satellites (5) are overhead allows subscriber unit (2) to more quickly acquire and track the global positioning satellites (5) required to accurately geo-locate itself. Subscriber unit (2) computes accurate location data and can transmit this data to gateway (1).

13 Claims, 2 Drawing Sheets

METHOD AND APPARATUS FOR AN ACQUISITION-AIDED GEO-LOCATING SUBSCRIBER UNIT

CROSS-REFERENCE TO RELATED APPLICATIONS

The present invention is related to the following patents or patent applications, all of which are assigned to the same assignee as the present invention:

U.S. Pat. No. 5,119,504, "Position Aided Subscriber Unit For A Satellite Cellular System", Isaac N. Durboraw, III;

U.S. Pat. No. 5,365,451, "Mobile Unit Tracking System", Theresa C. Y. Wang et al.;

U.S. Pat. No. 5,414,432, "Position Locating Transceiver", Robert E. Penny Jr. et al.; and U.S. patent application Ser. No. 8/690,097, "Method and Apparatus for a Global Positioning Data Service," filed concurrently with the present application.

FIELD OF THE INVENTION

The present invention pertains to portable telecommunication devices and more particularly to portable telecommunication devices which use location information from a satellite communication system to aid in a self-determined geo-location process.

BACKGROUND OF THE INVENTION

When achieving communication between communication satellites and world-wide users of a global telecommunication system, accurate knowledge of a location of each user and each satellite is important to establishing and maintaining a communication link. A subscriber unit which combines voice/data communication and accurate, location self-determination has several advantages as described in prior art. Applications of such a subscriber unit in a system include asset management as described in the prior art. Prior art patents also describe applications such as the coordination of activities of search and rescue and various military operations.

Since communications between a subscriber unit and a group of satellites can involve frequent hand-offs between cells created by the individual satellites and between adjacent satellites, knowledge of accurate location data for both the subscriber unit and the satellites can be used to efficiently determine an appropriate hand-off strategy. Accurate location data for a subscriber unit also aids in the acquisition process by permitting precise correction for Doppler and reference frequency induced errors. In addition, accurate subscriber unit location data allows a telecommunication system operating in a global market to conform to diverse rules and procedures which can be imposed by diverse political entities within whose jurisdiction a telecommunication system can operate.

The more accurate the location data, the better. More accurate data allow a telecommunication system to better ascertain when subscriber units cross from one jurisdiction into another. However, costs generally increase in proportion to the accuracy of the location data, and an intense need to keep the costs as low as possible and the revenues as high as possible exists. One cost which is of particular concern is the amount of communication resources which are consumed in maintaining current location data. As more resources are consumed in maintaining current location data, fewer resources are available for use by communication service subscribers and for generating revenues.

A GPS (Global Positioning System) receiver can achieve great accuracy in self-determining location in a short period of time if it has current ephemeris data and almanac data and has not moved beyond 500 to 1000 km from its last location. Generally, a GPS receiver is required to receive the latest ephemeris data from the satellite and so the time to first location fix is dominated by the time taken by the GPS receiver to receive the data. A GPS location acquisition process, in general, includes the following steps:

1) Prediction of GPS satellite visibility/Doppler at the current time;
2) Sequential detection of those satellites thought to be visible. The detection process switches to a sky search on all the satellites if no acquisition is achieved;
3) Acquisition process hands off to track process;
4) Track process includes acquiring message synchronization, and collecting time from a GPS broadcast message;
5) Track process also includes collecting ephemeris data; and
6) Track process continues with the collection of almanac data.

When GPS receivers are turned on from a warm start, a receiver must find appropriate satellites and then collect current ephemeris from the GPS satellites. This data could be transmitted at 50 bits per second, for example, and could take 30 seconds to collect from each of the satellites that are tracked.

If a GPS receiver is doing a cold start or a GPS receiver has moved a great distance around the earth, then the receiver must find the satellites in view without any apriori knowledge. This complete search can take minutes. After satellites are acquired, the receiver then must collect a complete almanac from the GPS satellite, which includes information on the current satellites' orbits and health.

Also, if exact location is not required, then a GPS receiver does not need ephemeris data, and almanac data by itself can be used to estimate satellite location. This results in a loss of accuracy depending on the age of the almanac. A benefit of using almanac data only is that the ephemeris collections can be bypassed and the access time is shortened. However, provisions to update the almanac data must be provided eventually. A GPS receiver takes about 12.5 minutes to accomplish this task and requires a continuous track on at least one GPS satellite. Bit errors and blockages can cause GPS receivers to use multiple 12.5 minute intervals and this can lead to excessive battery drain. Subscriber units are often battery operated, and an excessive battery drain is not acceptable.

Accordingly, there is a significant need for a geo-location subscriber unit to obtain and use positioning information from a global communication satellite system to decrease the time that a subscriber unit located anywhere proximate to the surface of the earth takes to self-determine accurate location data using geo-location information supplied by a global positioning system.

BRIEF DESCRIPTION OF THE DRAWINGS

A more complete understanding of the present invention can be derived by referring to the detailed description and claims when considered in connection with the FIGS., wherein like reference numbers refer to similar items throughout the FIGS., and:

DETAILED DESCRIPTION OF PREFERRED EMBODIMENTS

The present invention describes a subscriber unit and global communication system that have been adapted to work with each other to achieve an improved method for subscriber unit self-determination of accurate location data.

One advantage of the present invention is that a subscriber unit will consume less battery power to acquire and track satellites in a global positioning system.

Another advantage is that call-processing will be easier and faster because a global communication system has accurate location data for a subscriber unit in a shorter amount of time.

Also, the accounting process will be easier and more precise because accurate subscriber unit location data is made available quickly. The prior art GPS receivers and position location systems do not provide these features.

In contrast to known positioning systems, a positioning system constructed in accordance with the present invention enables a subscriber unit to self-determine its coarse location data using a single multi-beamed satellite. Thus, it is an advantage of the present invention to provide a geo-positioning system which does not require multiple communication satellites. Further, a positioning system constructed in accordance with the present invention does not require subscriber unit to transmit to the communication satellite constellation in order to determine its coarse location, thus resulting in significant conservation of subscriber unit battery power.

Figure 1:
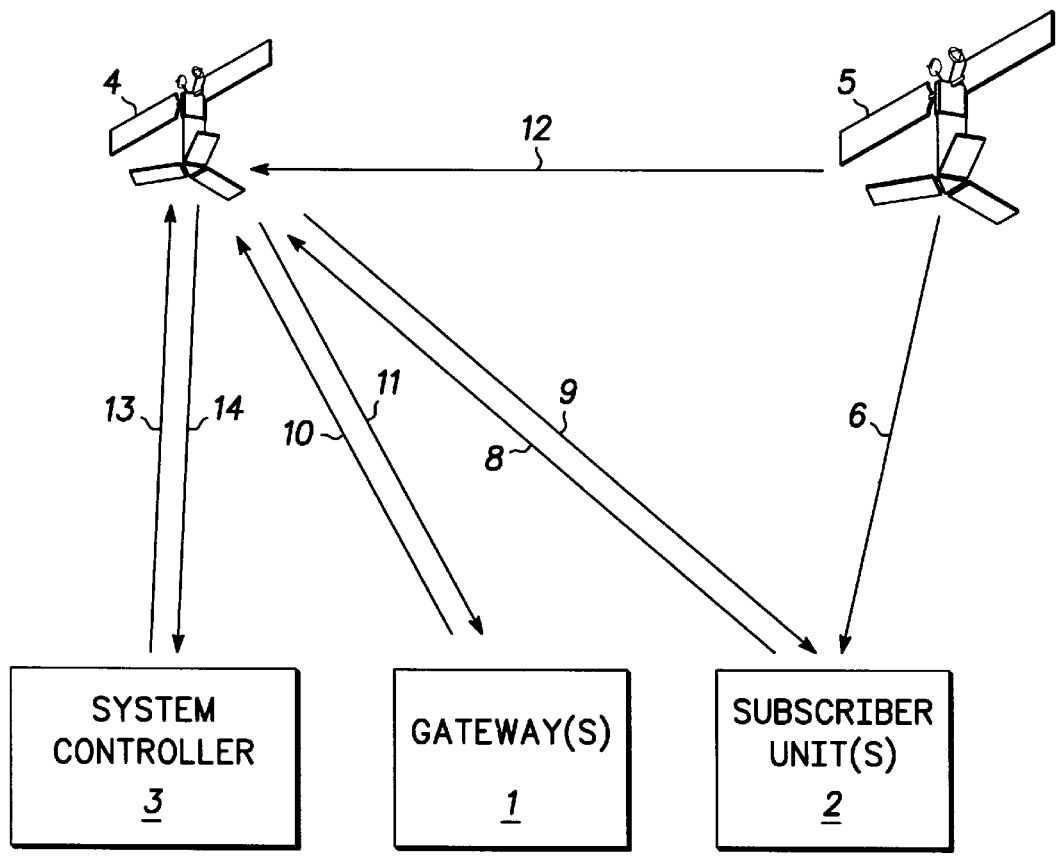
FIG. 1 shows a block diagram of a telecommunication system in accordance with a preferred embodiment of the present invention.

FIG. 1 shows a block diagram of telecommunication system 15 in accordance with a preferred embodiment of the present invention. System 15 includes communication satellites 4, global positioning satellites 5 which orbit the earth and at least one system controller 3, at least one gateway 1, and subscriber units 2 which are on or proximate to the surface of the earth. Global positioning system satellites 5 can be the same or different than communication satellites 4. Communication satellites 4 are part of a global communication system (not shown). Communication satellites 4 are in data communication with one another through data communication links that are not shown. In addition, communication satellites 4 receive signals on link 12 from global positioning system satellites 5. Communications, data and control signals can be routed on uplinks 13 and downlinks 14 by system controller 3 to communication satellites 4. Satellites 4 and gateways 1 serve as nodes for a global communication system (not shown) in telecommunication system 15. In a preferred embodiment, gateways 1 are located at fixed points on the surface of the earth. In addition, gateways 1 couple to a public switched telecommunication network (PSTN) (not shown) and route communications to PSTN users.

Telecommunication system 15 provides communication and data services to many subscriber units 2 located anywhere proximate to the surface of the earth. Since telecommunication system 15 provides global telecommunication services to fixed and mobile subscriber units 2, telecommunication system 15 can have past and current location data for all registered subscriber units 2. Location data are extremely valuable to a global telecommunication system 15. Knowledge of subscriber unit 2 location allows telecommunication system 15 to most advantageously route communications through nodes of system 15.

Subscriber units 2 can be configured as conventional portable radio communication equipment adapted to perform geo-location procedures. In a preferred embodiment of the present invention, telecommunication system 15 accommodates the movement of subscriber units 2. However, subscriber unit movement is not required. Subscriber units 2 are configured to communicate with nearby satellites and to perform other functions which are discussed below.

Subscriber units 2 are able to establish uplink 8 and downlink 9 with at least one of communication satellites 4 in a global communication system and to establish link 6 to receive data from visible global positioning satellites 5. Subscriber units 2 can obtain coarse estimates of their locations from information supplied on downlink 9 from communication satellites 4. Subscriber units 2 also store their own current and past location data. In a preferred embodiment of the present invention, subscriber units 2 can register in one geo-political jurisdiction but can operate in any one of a number of different geo-political jurisdictions. Subscriber units 2 can be equipped with at least one of the types of global positioning receivers (e.g., GPS or GLONASS) and are able to process global positioning data service data for the global positioning systems they were designed to operate with.

Gateways 1 are able to establish uplink 10 and downlink 11 with at least one of communication satellites 4. Gateways 1 and subscriber units 2 are linked through satellites 4 of a global communication system (not shown).

Global Positioning System (GPS) is a constellation of satellites 5 which transmits navigation information via radio signals. Time and location can be calculated by receivers which are able to receive and process these radio signals. GLONASS was another GPS-like satellite system. Both systems use two modulated L-band signals. The modulated signals include pseudo-random noise codes and data.

For convenience of explanation and not intended to be limiting to the present invention, operation of telecommunication system 15 is described for a GPS system, but those skilled in the art will understand that other location systems can also be used.

Figure 2:
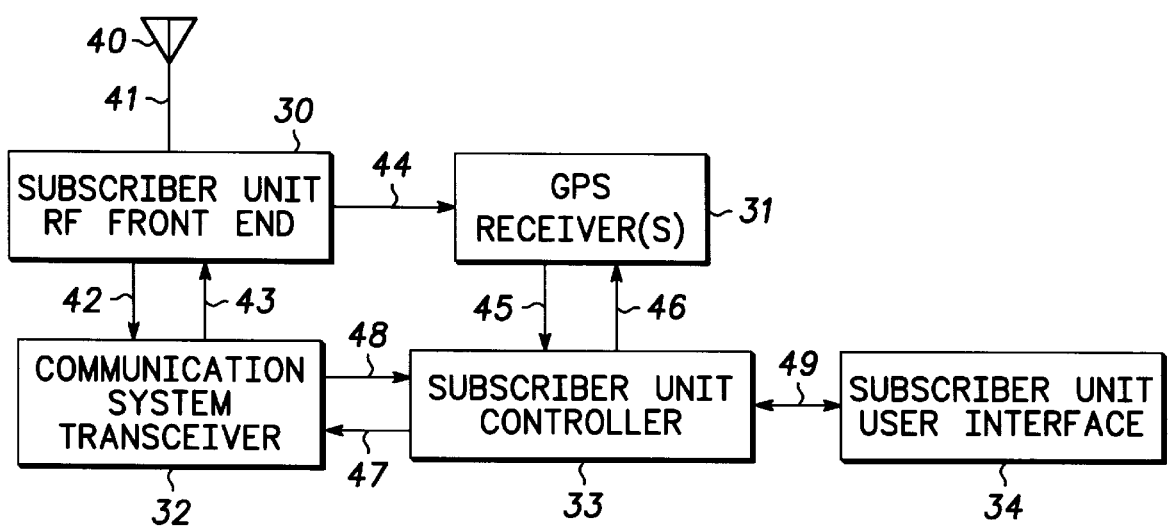
FIG. 2 shows a block diagram of a subscriber unit which operates within a telecommunication system and uses positioning information from a communication satellite to help it in performing its geo-location procedures in accordance with a preferred embodiment of the present invention.

FIG. 2 shows a block diagram of subscriber unit 2 which operates within telecommunication system 15 (FIG. 1) and uses positioning information from communication satellite 4 (FIG. 1) to help it perform its geo-location procedures in accordance with a preferred embodiment of the present invention. Antenna 40 receives downlink data from a global positioning system such as GPS as well as downlink data transmitted from satellites 4 (FIG. 1) of a global communication system. In addition, antenna 40 transmits on an uplink voice and digital data from subscriber unit 2 to satellites 4 (FIG. 1) of the global communication system.

Antenna 40 is connected via link 41 to subscriber unit radio frequency (R.F.) front-end 30. Since global positioning system information as well as transmissions from global communication system satellites 4 (FIG. 1) are in the same frequency band, they must be separated for processing. R.F. front-end 30 provides for the decombination of downlink signals into global positioning system signals which are carried on line 44 and global communication system received signals which are carried on line 42. R.F. front-end 30 also provides for the isolation of incoming downlink signals and outgoing uplink signals on link 41.

R.F. front-end 30 is connected via links 42,43 to communication system transceiver 32. Links 42,43 are provided for communication system transmitted signals and communication system received signals. Transceiver 32 transmits and receives signals in a format compatible with communication satellites 4 in the global communication system. These signals include data messages which allow subscriber unit 2 to be in data communication with a nearby communication satellite 4 (FIG. 1). Through this satellite 4, subscriber unit 2 could also be in data communication with any other node of the global communication system, such as a nearby gateway 1 (FIG. 1).

R.F. front-end 30 is also connected via link 44 to a global positioning system receiver 31. R.F. front-end 30 ensures that global positioning system receiver 31 receives on link 44 only information from a global positioning system. Subscriber unit 2 receives signals broadcast by global positioning system and generates data describing a current location of the subscriber unit.

Communication system transceiver 32 serves to demodulate downlink data from a downlink carrier signal and modulate uplink data onto an uplink carrier signal. Demodulated data is sent via link 48 to subscriber unit controller 33. Modulation data is sent via link 47 from controller 33 to transceiver 32.

Communication system transceiver 32 and global positioning system receiver 31 both couple via links 45–48 to subscriber unit controller 33. Controller 33 additionally couples via link 49 to subscriber unit user interface 34. Also in a preferred embodiment, user interface 34 is used to collect user inputs, such as the operation of power switches, and the collection of phone numbers for placing a call. User interface 34 is also used to display messages included in the global positioning data service process to the user.

Controller 33 maintains a record of current date and time. A memory portion of controller 33 includes an ability to store data which serve as instructions to controller 33 and which, when executed by controller 33, cause subscriber unit 2 (FIG. 1) to carry out procedures which are discussed in text and flow charts below. In addition, a memory portion includes variables, tables, and databases that are manipulated due to the operation of subscriber unit 2 (FIG. 1).

Controller 33, in a preferred embodiment, has access to timing and memory devices. Controller 33 also maintains records of the subscriber unit's current location and update time. Controller 33 also maintains a record of coarse and accurate location data. Controller 33 also maintains a record of the latest almanac received from the global positioning system. Coarse location data is computed by controller 33 using information in signals broadcast by communication satellites 4 (FIG. 1) in the global communication system. Accurate location data is computed by controller 33 using information in signals broadcast by satellites 5 (FIG. 1) in a global positioning system.

Controller 33 maintains a record of the satellites the global positioning receiver used to compute accurate location data. As will be discussed in more detail below, subscriber units 2 (FIG. 1) determine their own coarse and accurate location data. In a preferred embodiment of the present invention, subscriber units 2 (FIG. 1) utilize a global positioning system, such as the Global Positioning System (GPS), to determine accurate location data. In addition, many other types of position-determining receivers can be used by subscriber unit.

Subscriber unit 2 utilizes conventional techniques to monitor and process signals transmitted by communication satellites 4 (FIG. 1) to self-determine coarse location data. Conventional techniques can include, for example, methods for performing location determination using multi-beam satellites in which each beam of a multi-beam satellite transmits identification information which is received by subscriber unit 2. This identification information either identifies the unique beam by enumeration or by geometries.

In a preferred embodiment of the present invention, a subscriber unit 2 processes multiple received signals from orbiting satellites. Subscriber unit 2 maps the projected beam patterns of multiple received samples to determine an approximate self-location. Subscriber unit 2 passively monitors its location and compares its current location with its previously reported location. When subscriber unit 2 has sufficiently roamed from its previously registered location, subscriber unit 2 performs an auto-registration to the system allowing for efficient routing of information.

In a preferred embodiment of the present invention, coarse location data for subscriber units can be determined from satellites which projects multiple uniquely identified beams upon the earth by identifying each unique passing beam. Subscriber unit 2 can discern which beam is its servicing beam by determining the source of the greatest radiated power directed at it. Then, subscriber unit 2 receives the satellite's transmitted beam information and processes it to derive beam geometry information and, in conjunction with any existing stored information, to determine subscriber unit's coarse location.

Figure 3:
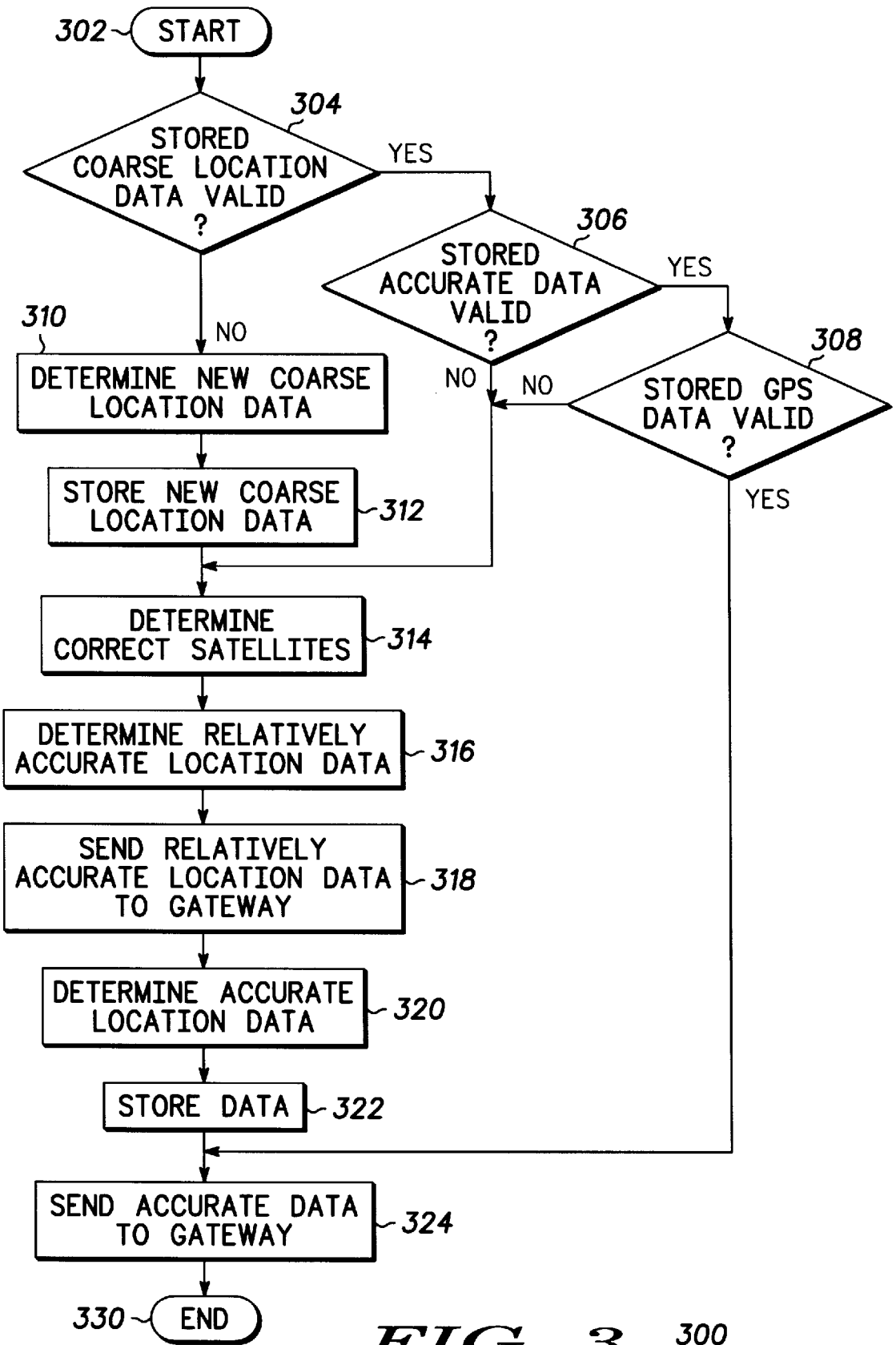
FIG. 3 shows a flow chart for a version of a geo-location procedure desirably performed by a subscriber unit in accordance with a preferred embodiment of the present invention.

FIG. 3 shows a flow chart for a version of a geo-location procedure desirably performed by a subscriber unit in accordance with a preferred embodiment of the present invention. Process 300 is performed by the controller in subscriber unit, and starts in step 302. Process 300 can be performed during start-up, registration or re-registration procedure for example.

In step 304, a query is perform by the controller to determine if the stored coarse location data is valid. If the stored coarse location data is not valid, then process 300 continues with step 310. If the stored coarse location data is valid, then another query is performed in step 306 to determine if the stored accurate location data is valid. If the stored accurate location data is not valid, then process 300 continues with step 314. If the stored accurate location data is valid, then another query is performed in step 308 to determine if the stored global positioning system data is valid. If the stored global positioning system data is not valid, then process 300 continues with step 314. If the stored global positioning system data is valid, then process 300 proceeds to step 324, where the accurate data is sent to the gateway and to step 330, where the process ends.

The stored coarse, accurate, or GPS data can be determined to be not valid for any one of a number of reasons. For example, the stored data could be incorrect if the subscriber unit has moved to a new location. Another example reason for invalid data is age. In this case the storage date for the data could be checked with respect to some value. If the storage date precedes this value then the data is determined to be invalid. If the stored coarse location data is not valid, the stored accurate location data is also assumed not to be valid.

If the stored coarse location data is not valid, then in step 310 new coarse location data for subscriber unit is determined using information received from a communication satellite. Determining new coarse location data, can comprise the steps of receiving a satellite signal having unique servicing beam information, processing a beam geometry which describes a representation of the beam shape and a geographical beam center which defines a geographical coordinate within the servicing beam, and calculating a region wherein the subscriber unit is located.

Referring again to FIG. 3, in step 312 coarse location data is stored. In step 314, the coarse location data is used to determine which global positioning system (e.g. GPS) satellites are overhead at the subscriber unit's current location which is defined by the coarse location data. The GPS receiver can acquire and track these global positioning system satellites as they remain visible to the subscriber unit's antenna.

The coarse location data has been determined in step 310 and stored in step 312 gives the location to a resolution of approximately hundreds of kilometers. The subscriber unit determines in step 314, using the current almanac data alone, the correct global positioning system satellites to search for.

In step 316, the subscriber unit can use the almanac data alone. This allows the subscriber unit to rapidly acquire the global positioning satellites since it knows the satellites and the expected Doppler and circumvents the need to search and to gather local ephemeris data. The disadvantage of this method is that the exact location accuracy is compromised. However if exact location is not needed, as in the registration process, the use of almanac data alone can provide location accuracy to a resolution of a few kilometers. This is useful in a telecommunications system where the location need only be known to a resolution of approximately tens of kilometers. The relatively accurate location data can be sent to the gateway, as shown in step 318, for further processing and storage.

The use of relatively accurate location data allows the subscriber unit to compute an accurate range delay to the telecommunications satellite. This provides for a one try access attempt to hit the telecommunications satellite time window and eliminates the need for stepping through many values of delay. All this is accomplished in approximately 5 seconds since the need to search for GPS satellites and collect ephemeris data is eliminated saving about 20 seconds in access time.

In step 320, the subscriber unit takes the time to gather the ephemeris data and determine the accurate location data. In step 322, the accurate location data is stored by the subscriber unit. The accurate location data can be sent to the gateway, as shown in step 324, for further processing and storage. Process 300 ends with step 330.

As explained in conjunction with tasks 318 and 324, accurate location data can be set to the gateway and stored in gateway's subscriber unit database. The database includes a record for each registered subscriber unit 2 (FIG. 1). For example, each record can include a data field for subscriber unit's ID, a data field for subscriber unit's coarse location, a data field for subscriber unit's accurate location, and data fields for time data associated with location data.

In a preferred embodiment, subscriber units 2 (FIG. 1) repetitively perform location update procedures on a regular schedule while operating in either standby mode or in a call mode. During a location update procedure, subscriber unit can determine a need to re-register due to a passage of time or a change in location. This regular schedule can vary from once every few seconds to once every several minutes or hours.

In a preferred embodiment of the present invention, when subscriber unit 2 (FIG. 1) is waiting for either an incoming call or for user input instructing an outgoing call, it operates in a standby mode. From standby mode it can enter and return from a call processing mode when another telecommunication system user calls. When subscriber unit 2 (FIG. 1) is off (i.e., powered down), it enters a battery saving power down state.

In a preferred embodiment of the present invention, subscriber units 2 (FIG. 1) determine their current locations on a regular schedule. When their current locations are outside of a particular threshold value with respect to their past location, they send location data messages to telecommunication system 15 (FIG. 1) which contain information for updating location data being maintained by gateway 1 (FIG. 1). Subscriber units 2 (FIG. 1) receive definitions of new threshold values from gateway 1.

If this predetermined threshold has not been exceeded, then subscriber unit 2 (FIG. 1) compares a time stamp recorded with location data with the current date and time to determine if a predetermined duration has expired. Preferably, this duration is set to a very large value, such as once a month, so that relatively stationary subscriber units 2 (FIG. 1) do not consume a significant amount of battery power or communication resources in reporting their locations to telecommunication system 15 (FIG. 1).

While process 300 is preferably performed during power-on or re-registration, a subscriber unit 2 (FIG. 1) can receive a message to update accurate location data from telecommunication system 15 (FIG. 1) at any time. An update message instructs subscriber unit 2 (FIG. 1) to respond by sending accurate location data describing its current location. In this update message, gateway 1 (FIG. 1) can include almanac and ephemeris data for subscriber unit 2 (FIG. 1). When an update message is received, some or all of the steps in process 300 can be performed.

The previously described subscriber unit with global communication system provided global positioning data provides the following advantages. First, a global communication system, by more quickly knowing a subscriber unit's fine location, will be able to provide better service to that subscriber unit especially in a congested area.

Second, in an emergency situation, a subscriber unit can be accurately located in a shorter amount of time. This will aid responding personnel by pin-pointing an exact location for the emergency.

The present invention has been described above with reference to a preferred embodiment. However, those skilled in the art will recognize that changes and modifications can be made in this preferred embodiment without departing from the scope of the present invention. For example, while a preferred embodiment has been described in terms of using a GPS satellite based positioning system for providing location signals to subscriber units, other positioning systems or methods can also be employed. Accordingly, these and other changes and modifications which are obvious to those skilled in the art are intended to be included within the scope of the present invention.

What is claimed is:

1. In a telecommunication system comprising a plurality of global positioning satellites, at least one communication satellite, at least one gateway, and at least one subscriber unit adapted to perform geo-location procedures, a method of operating said at least one subscriber unit comprising the steps of:

a) determining whether stored coarse location data for said at least one subscriber unit is valid;

b) if said stored coarse location data is not valid, determining coarse location data for said at least one subscriber unit using information only from one of said at least one communication satellite without using information from said global positioning satellites;

c) using said coarse location data to determine the correct satellites in said plurality of global positioning satellites, wherein said correct satellites are satellites that are visible to said at least one subscriber unit's antenna at said at least one subscriber unit's current location;

d) acquiring and tracking said correct satellites in said plurality of global positioning satellites; and e) self-determining current accurate location data for said at least one subscriber unit using said correct satellites in said plurality of global positioning satellites.

2. The method as claimed in claim 1 further comprising the step of:

f) sending via said at least one communication satellite said current accurate location data to said one of said at least one gateway.

3. The method as claimed in claim 1, further comprising the steps of:

f) determining whether a set of stored accurate location data for said at least one subscriber unit is valid; and g) determining whether a set of stored global positioning system data for said at least one subscriber unit is valid.

4. In a telecommunication system comprising a plurality of global positioning satellites, at least one communication satellite, at least one gateway, and at least one subscriber unit adapted to perform geo-location procedures, a method of operating said at least one subscriber unit comprising the steps of:

a) determining that stored location data for said at least one subscriber unit is not current;

b) determining new coarse location data for said at least one subscriber unit using information only from one of said at least one communication satellite without using information from said global positioning satellites;

c) using said new coarse location data to determine certain ones of said plurality of global positioning satellites that are visible to said at least one subscriber unit;

d) acquiring and tracking said certain ones of said plurality of global positioning satellites that are visible to said at least one subscriber unit;

e) self-determining relatively accurate location data for said at least one subscriber unit using almanac data for said certain ones of said plurality of global positioning satellites;

f) sending via said at least one communication satellite said relatively accurate location data to said at least one gateway;

g) gathering local ephemeris data for said plurality of global positioning satellites;

h) using said local ephemeris data to determine accurate location data; and i) sending via said at least one communication satellite said accurate location data to said at least one gateway.

5. The method as claimed in claim 4 wherein step a) comprises the step of:

determining whether stored coarse location data is not current because said stored coarse location data is older than some value.

6. In a telecommunication system comprising a plurality of global positioning satellites, at least one communication satellite, at least one gateway, and at least one subscriber unit adapted to perform geo-location procedures, a method of operating said at least one subscriber unit comprising the steps of:

a) determining current stored location data for said at least one subscriber unit is not valid;

b) determining new coarse location data for said at least one subscriber unit using information only from one of said at least one communication satellite without using information from said global positioning satellites;

c) using said new coarse location data to determine certain ones of said plurality of global positioning satellites that are visible to said at least one subscriber unit;

d) acquiring and tracking said certain ones of said plurality of global positioning satellites determined using said new coarse location data;

e) self-determining accurate location data for said at least one subscriber unit using certain ones of said plurality of global positioning satellites.

7. The method as claimed in claim 6 further comprising the step of:

f) sending via said at least one communication satellite said accurate location data to said at least one gateway.

8. In a telecommunication system comprising a plurality of global positioning satellites, at least one communication satellite, at least one gateway, and at least one subscriber unit adapted to perform geo-location procedures, a method of operating said at least one subscriber unit comprising the steps of:

a) determining that stored location data for said at least one subscriber unit is not correct;

b) determining new coarse location data for said at least one subscriber unit using only information from one of said at least one communication satellite without using information from said global positioning satellites;

c) using said new coarse location data to determine certain ones of said plurality of global positioning satellites that are visible to said at least one subscriber unit;

d) acquiring and tracking said certain ones of said plurality of global positioning satellites that are visible to said at least one subscriber unit;

e) self-determining relatively accurate location data for said at least one subscriber unit using almanac data for said certain ones of said plurality of global positioning satellites;

f) sending via said at least one communication satellite said relatively accurate location data to said at least one gateway;

g) gathering local ephemeris data for said plurality of global positioning satellites;

h) using said local ephemeris data to determine accurate location data; and i) sending via said at least one communication satellite said accurate location data to said at least one gateway.

9. The method as claimed in claim 8 wherein step a) comprises the step of:

determining whether said stored coarse location data is not correct because said at least one subscriber unit has changed location.

10. A subscriber unit, adapted to perform geo-location procedures in a telecommunication system, comprising:

first receiver means for receiving positioning information from a communication satellite in said telecommunication system;

second receiver means for receiving geo-location data from global positioning satellites in said telecommunication system;

controller means coupled to said first receiver means and to said second receiver means for:

a) determining coarse location data for said subscriber unit using only information from said communication satellite without using information from said global positioning satellites, b) determining that a set of stored location data for said subscriber unit is not current, c) using almanac data for said global positioning satellites to determine certain ones of said global positioning satellites that are visible to said at least one subscriber unit, d) using said coarse location data to determine certain ones of said global positioning satellites to use for receiving said geo-location data, e) acquiring and tracking said certain ones of said global positioning satellites, and f) self-determining accurate location data for said subscriber unit using said certain ones of said global positioning satellites; and storage means coupled to said controller means for storing said coarse location data and for storing said almanac data.

11. The subscriber unit as claimed in claim 10 further comprising:

transmitter means coupled to said controller means for transmitting via said communication satellite said accurate location data to a gateway of said telecommunication system.

12. In a telecommunication system comprising a plurality of global positioning satellites, at least one communication satellite, at least one gateway, and at least one subscriber unit adapted to perform geo-location procedures, a method of operating said at least one subscriber unit comprising the steps of:

a) determining whether stored coarse location data for said at least one subscriber unit is valid; and b) if said stored coarse location data is not valid, determining coarse location data for said at least one subscriber unit using only information from at least one of said at least one communication satellite without using information from said global positioning satellites;

c) using said coarse location data to determine the correct satellites in said plurality of global positioning satellites, wherein said correct satellites are satellites that are visible to said at least one subscriber unit's antenna at said at least one subscriber unit's current location; and d) acquiring and tracking said correct satellites in said plurality of global positioning satellites.

13. A subscriber unit, adapted to perform geo-location procedures in a telecommunication system, comprising:

a first receiver for receiving positioning information from a communication satellite in said telecommunication system;

a second receiver for receiving geo-location data from a plurality of global positioning satellites in said telecommunication system;

controller means coupled to said first receiver and to said second receiver for:

a) determining coarse location data for said subscriber unit using only information from said communication satellite without using information from said global positioning satellites, b) using said coarse location data to determine at least one correct satellite in said plurality of global positioning satellites, wherein said at least one correct satellite is one or more satellites that are visible to said at least one subscriber unit's antenna at said at least one subscriber unit's current location, c) acquiring and tracking said at least one correct satellite in said plurality of global positioning satellites, and d) self-determining current accurate location data for said at least one subscriber unit using said at least one correct satellite in said plurality of global positioning satellites; and storage means coupled to said controller means for storing said coarse location data.

* * * * *